United States Patent
Carrier et al.

(10) Patent No.: US 9,719,588 B2
(45) Date of Patent: Aug. 1, 2017

(54) TORQUE CONVERTER WITH COAST LOCKUP

(71) Applicant: Schaeffler Technologies AG & Co. KG, Herzogenaurach (DE)

(72) Inventors: John Carrier, Lodi, OH (US); Michael G. Swank, Shreve, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 124 days.

(21) Appl. No.: 14/881,488

(22) Filed: Oct. 13, 2015

(65) Prior Publication Data

US 2017/0102060 A1 Apr. 13, 2017

(51) Int. Cl.
F16H 45/02 (2006.01)

(52) U.S. Cl.
CPC ..... *F16H 45/02* (2013.01); *F16H 2045/0205* (2013.01); *F16H 2045/0221* (2013.01)

(58) Field of Classification Search
None
See application file for complete search history.

(56) References Cited

U.S. PATENT DOCUMENTS

| 2012/0006642 A1* | 1/2012 | Greathouse | F16H 45/02 192/3.29 |
| 2013/0248312 A1* | 9/2013 | Carrier | F16D 33/18 192/3.29 |
| 2014/0216879 A1* | 8/2014 | Gerdeman | F16H 45/02 192/3.28 |

* cited by examiner

*Primary Examiner* — Jacob S Scott
*Assistant Examiner* — Timothy M Hannon
(74) *Attorney, Agent, or Firm* — Chester Paul Maliszewski (57) ABSTRACT

A torque converter, including: an axis of rotation; a cover arranged to receive torque in a first circumferential direction for a drive mode; an impeller non-rotatably connected to the cover; a turbine in fluid communication with the impeller; a torque converter clutch including a piston; and a vibration damper including a cover plate connected to the torque converter clutch, an output flange and at least one spring engaged with the cover plate and the output flange. For a coast mode: the cover plate is arranged to rotate in a second circumferential direction opposite the first circumferential direction; the cover plate is arranged to displace the output flange in an axial direction; and the output flange is arranged to displace the piston in the axial direction.

20 Claims, 7 Drawing Sheets

PRIOR ART

Fig. 7

TORQUE CONVERTER WITH COAST LOCKUP

TECHNICAL FIELD

The present disclosure relates generally to a torque converter with vibration damper arranged to enable closing of a torque converter clutch during a coast mode for the torque converter. In particular, the vibration damper includes a cove plate with a ramp arranged to displace an output flange and piston into touch point engagement for the clutch.

BACKGROUND

Figure 7:
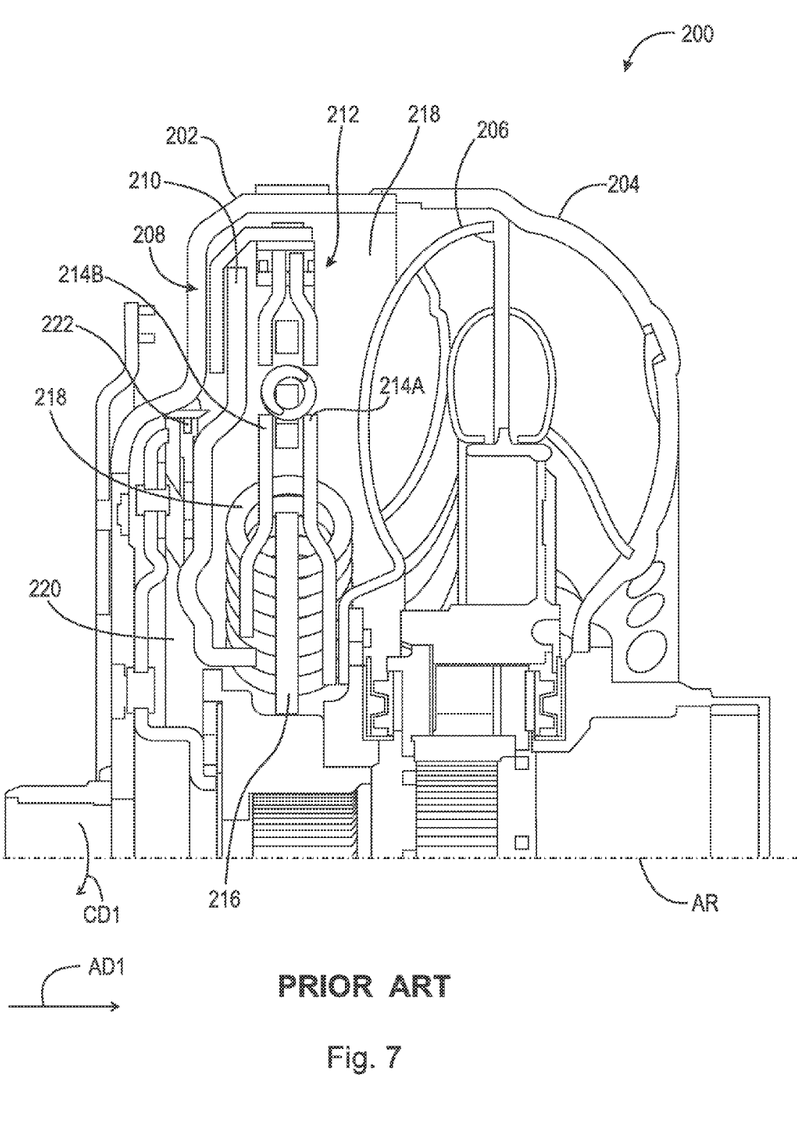

FIG. 7 is a partial cross-sectional view of prior art torque converter 200. Torque converter 200 includes: axis of rotation AR; cover 202 arranged to receive torque from an engine (not shown), for example in circumferential direction CD1 for a drive mode; impeller 204 non-rotatably connected to cover 202; turbine 206 in fluid communication with impeller 204; torque converter clutch 208 including piston 210; and vibration damper 212. Damper 212 includes: cover plates 214A and 214B connected to torque converter clutch 208; output flange 216; and at least one spring 218 engaged with cover plates 214A and 214B and output flange 216.

For a lockup mode, clutch 208 is closed. In a coast mode for torque converter 200, turbine 206 rotates faster than cover 202. As a result, fluid in chamber 218 rotates faster than fluid in chamber 220. This pressure differential will result in lower pressure in chamber 220, pulling piston 210 in direction AD1, undesirably preventing clutch 208 from remaining closed. To prevent this pressure differential, seal 222 is installed in chamber 218. Seal 222 blocks the fluid flow associated with the undesirable pressure differential. However, seal 222 adds to the cost and complexity of torque converter. Further, seal 222 reduces the overall durability of torque converter 200.

SUMMARY

The present disclosure broadly describes a torque converter, including: an axis of rotation; a cover arranged to receive torque in a first circumferential direction for a drive mode; an impeller non-rotatably connected to the cover; a turbine in fluid communication with the impeller; a torque converter clutch including a piston; and a vibration damper including a cover plate connected to the torque converter clutch, an output flange and at least one spring engaged with the cover plate and the output flange. For a coast mode: the cover plate is arranged to rotate in a second circumferential direction opposite the first circumferential direction; the cover plate is arranged to displace the output flange in an axial direction; and the output flange is arranged to displace the piston in the axial direction.

The present disclosure broadly describes a torque converter, including: an axis of rotation; a cover arranged to receive torque in a first circumferential direction for a drive mode; an impeller non-rotatably connected to the cover; a turbine in fluid communication with the impeller; a torque converter clutch including a piston; and a vibration damper including a first cover plate connected to the torque converter clutch and including at least one ramp, an output flange and at least one spring engaged with the cover plate and the output flange. For a coast mode: the cover plate is arranged to rotate in a second circumferential direction opposite the first circumferential direction; the at least one ramp is arranged to displace the output flange in a first axial direction; and the output flange is arranged to displace the piston in the first axial direction.

The present disclosure broadly describes a torque converter, including: an axis of rotation; a cover arranged to receive torque in a first circumferential direction for a drive mode; an impeller non-rotatably connected to the cover; a turbine in fluid communication with the impeller; and a vibration damper. The damper includes: a cover plate including a first surface facing in a first axial direction and at least one ramp non-rotatably connected to the first surface; an output flange including a second surface facing in a second axial direction opposite the first axial direction; and at least one spring engaged with the cover plate and the output flange. The torque converter includes a torque converter clutch including a piston and drive plate non-rotatably connected to the cover plate. For a coast mode: the cover plate is arranged to rotate in a second circumferential direction opposite the first circumferential direction, with respect to the flange; the at least one ramp is arranged to slide across the second surface to displace the output flange in the first axial direction; and the output flange is arranged to displace the piston in the first axial direction to frictionally engage the drive plate with the cover and the piston.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
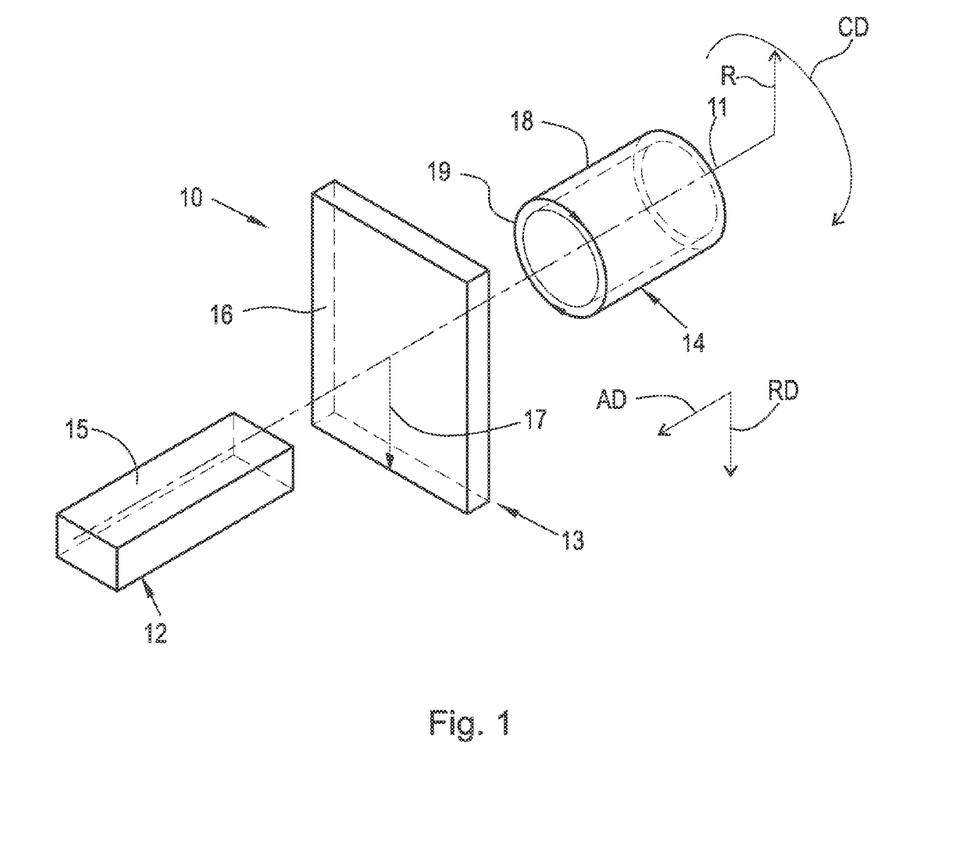
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
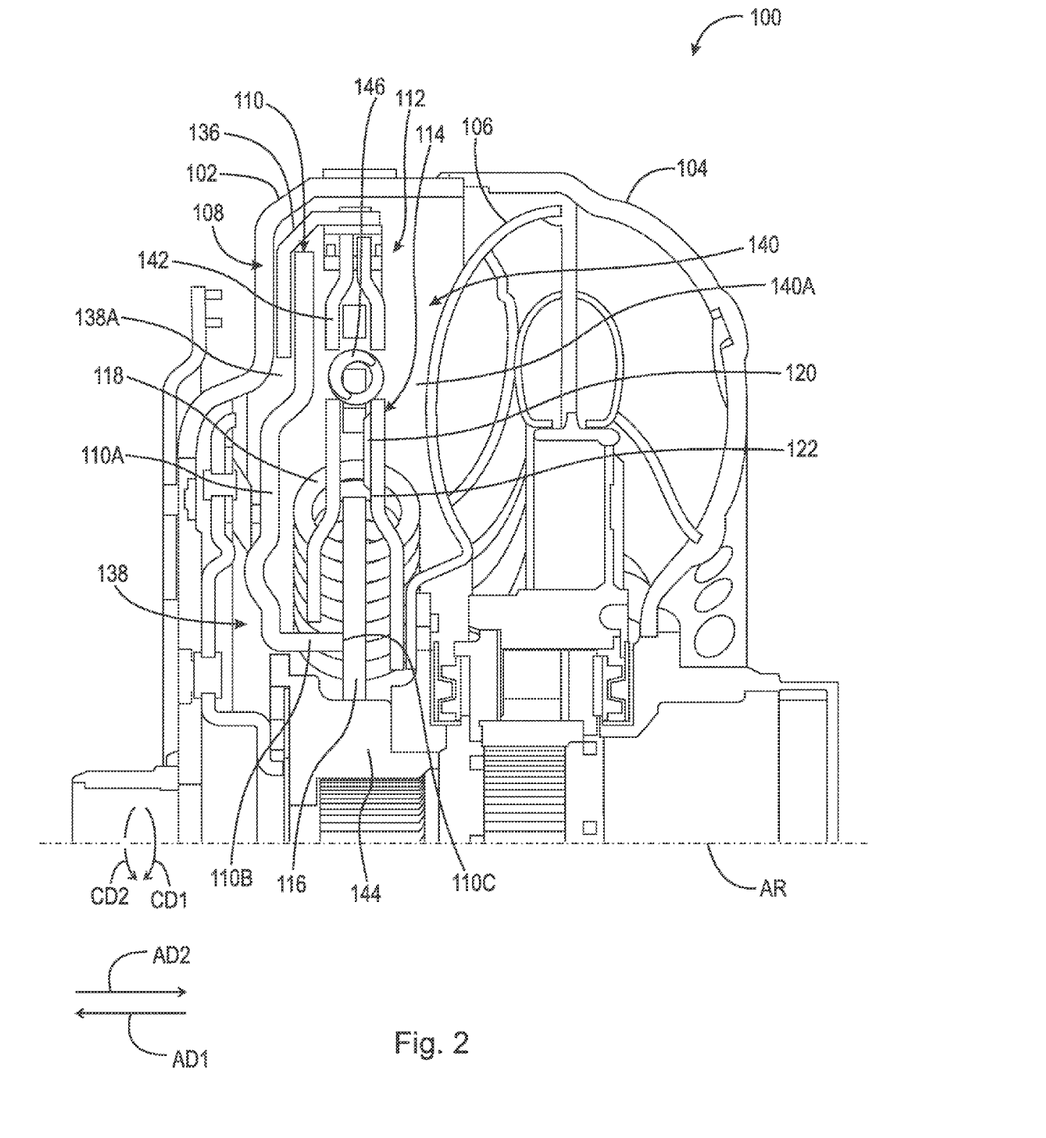
FIG. 2 is a cross-sectional view of a torque converter with coast lock in a coast mode.

FIG. 2 is a cross-sectional view of torque converter 100 with coast lock in a coast mode. Torque converter 100 includes: axis of rotation AR; cover 102 arranged to receive torque from an engine (not shown), for example in circumferential direction CD1 for a drive mode; impeller 104 non-rotatably connected to cover 102; turbine 106 in fluid communication with impeller 104; torque converter clutch 108 including piston 110; and vibration damper 112. Damper 112 includes: cover plate 114 connected to torque converter clutch 108; output flange 116; and at least one spring 118 engaged with cover plate 114 and output flange 116. By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

For a coast mode: cover plate 114 is arranged to rotate in circumferential direction CD2 opposite circumferential direction CD1; cover plate 114 is arranged to displace output flange 116 in axial direction AD1; and output flange 116 is arranged to displace piston 110 in axial direction AD1. In the coast mode, turbine 106 is rotating faster than cover 102.

Cover plate 114 includes at least one ramp 120 non-rotatably connected to surface 122. Surface 122 faces in direction AD1. In an example embodiment, ramps 120 are formed integrally with plate 114, that is, the plate and ramps are formed from a same single piece of material, for example by stamping. In an example embodiment, ramp 120 is formed separately from plate 114 and fixed to plate 114 by any means known in the art. In an example embodiment, cover plate 114 includes a plurality of ramps 120 circumferentially disposed about surface 122. The discussion that follows is directed to a single ramp 120; however, it should be understood that the discussion is applicable to a plurality of ramps 120. For the coast mode, ramp 120 is arranged to displace output flange 116 in axial direction AD1.

Figure 3:
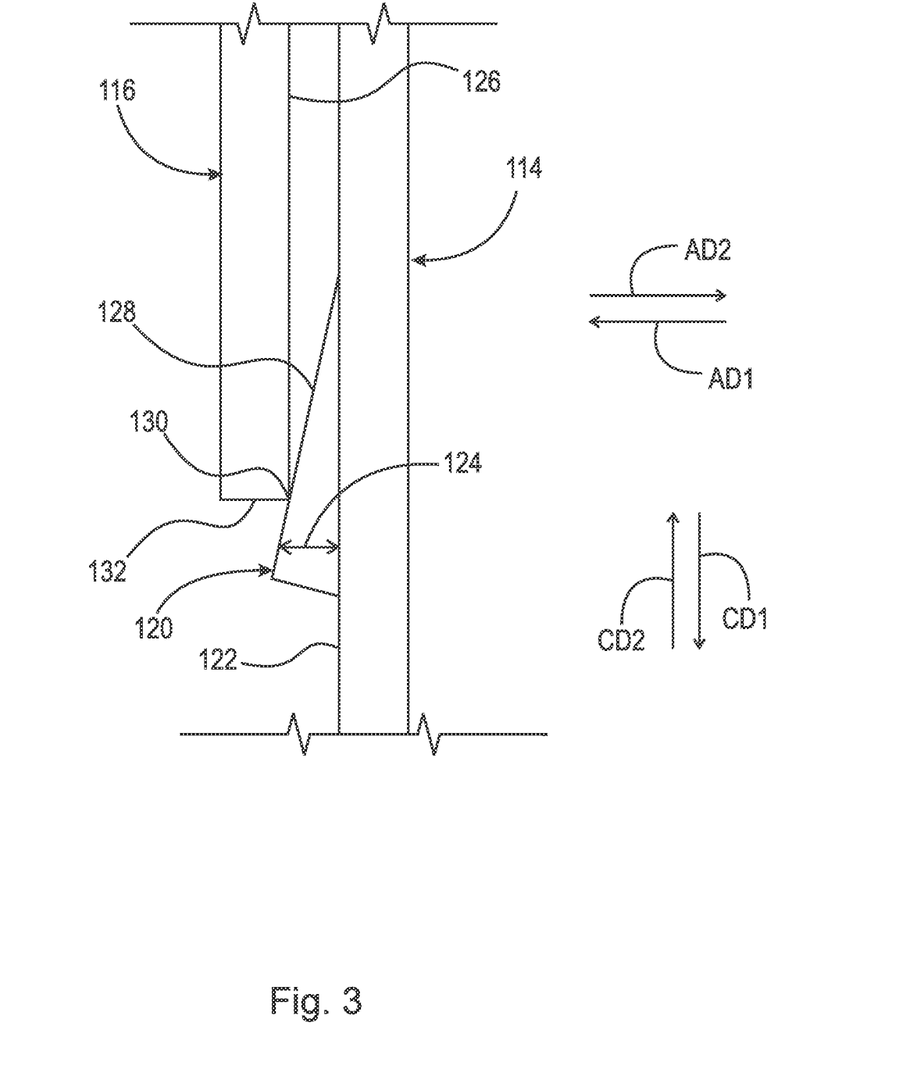
FIG. 3 is a plan view detail of a cover plate, ramp, and output flange shown in FIG. 2.

FIG. 3 is a plan view detail of plate 114, ramp 120, and flange 116 shown in FIG. 2. The following should be viewed in light of FIGS. 2 and 3. Extent 124 of ramp 120 in axial direction AD1 increases along circumferential direction CD1. Flange 116 includes surface 126 facing direction AD2. Ramp 120, in particular surface 128 of ramp 120, is directly engaged with surface 126 or in contact with surface 126. By "directly engaged" we mean that an ancillary element such as a washer or other mechanically solid device is between and in contact with surface 126 and ramp 120. In an example embodiment, corner 130 formed by surface 126 and end 132 of flange 116 is directly engaged with or in contact with ramp 120.

Piston 110 includes portions 110A and 110B. Portion 110A is substantially radially disposed and includes a most radially outward part of piston 110. Portion 110B extends from portion 110A in axial direction AD2 and includes distal end 110C. In the example of FIG. 2, for the coast mode, flange 116 is arranged to contact distal end 110C to displace piston 110 in axial direction AD1. In the lockup mode, clutch 108 is closed to transmit torque from cover 102 to damper 112 through clutch 108.

Figure 4:
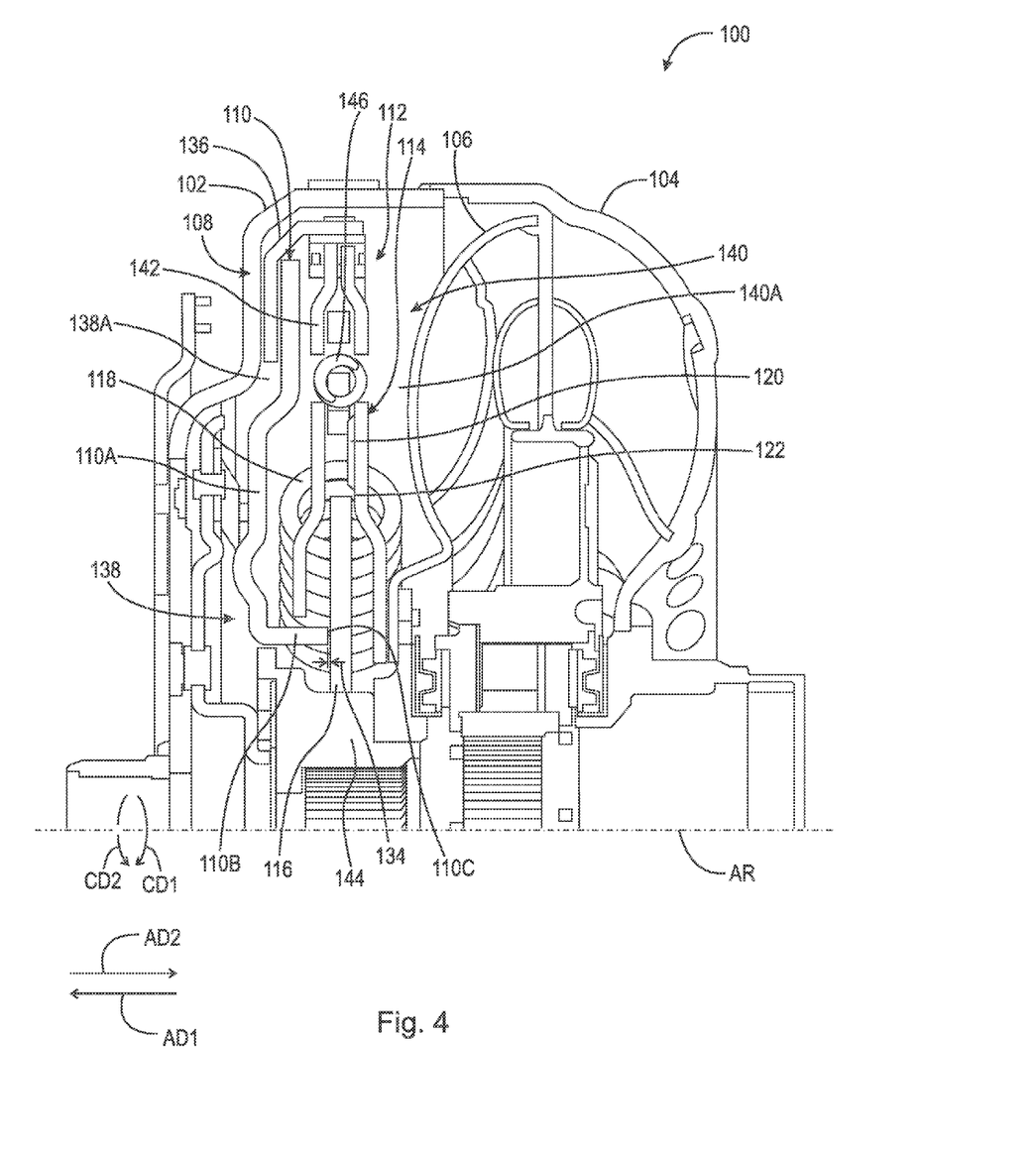
FIG. 4 is a cross-sectional view of the torque converter shown in FIG. 2 in a lockup mode.

FIG. 4 is a cross-sectional view of torque converter 100 with coast lock in a lockup mode. The following should be viewed in light of FIGS. 2 through 4. In an example embodiment, for the lockup mode, axial space 134 is present between output flange 116 and distal end 110C. That is, piston 110 has been displaced in direction AD1 to close clutch 108, while at the same time cover plate 114 has not rotated in direction CD2 (coast mode). Thus, flange 116 has not been displaced in direction AD1 as shown in FIG. 2. As a result of the displacement of piston 110 and the lack of displacement of flange 116 in direction AD1, space 134 is formed. The presence of space 134 prevents undesirable drag torque and wear of the piston plate and output flange during lockup mode. In a torque converter mode, in which cover 102 rotates faster than turbine 106 and clutch 108 is open, space 134 is still present due to the lack of displacement of flange 116 in direction AD1

In an example embodiment, torque converter clutch 108 includes drive plate 136 non-rotatably connected cover plate 114. For the coast mode, output flange 116 is arranged to displace in axial direction AD1 to frictionally engage cover 102, drive plate 136, and piston 110 to transmit torque between cover 102 to cover plate 114. Friction material is disposed between cover 102 and plate 136 and between plate 136 and piston 110.

In an example embodiment, torque converter 100 includes chambers 138 and 140. Chamber 138 includes portion 138A axially disposed between cover 102 and piston 110. Chamber 140 includes portion 140A axially disposed between piston 110 and turbine 106. Unlike the prior art torque converter discussed above, chamber 138 is free of a sealing element between cover 102 and piston 110. In an example embodiment, vibration damper 112 is located in chamber 140.

In an example embodiment, cover plate 114 is non-rotatably connected to turbine 106 by any means known in the art. In an example embodiment, damper 112 includes cover plate 142 non-rotatably connected cover plate 114 and engaged with spring 118. Flange 116 is axially disposed between cover plates 114 and 142. In an example embodiment, torque converter 100 includes output hub 144 arrange to non-rotatably connect to an input shaft for a transmission (not shown). In an example embodiment, damper 114 is a tilger damper including at least one spring 146 engaged with plate 114 and flange 116.

Figure 5:
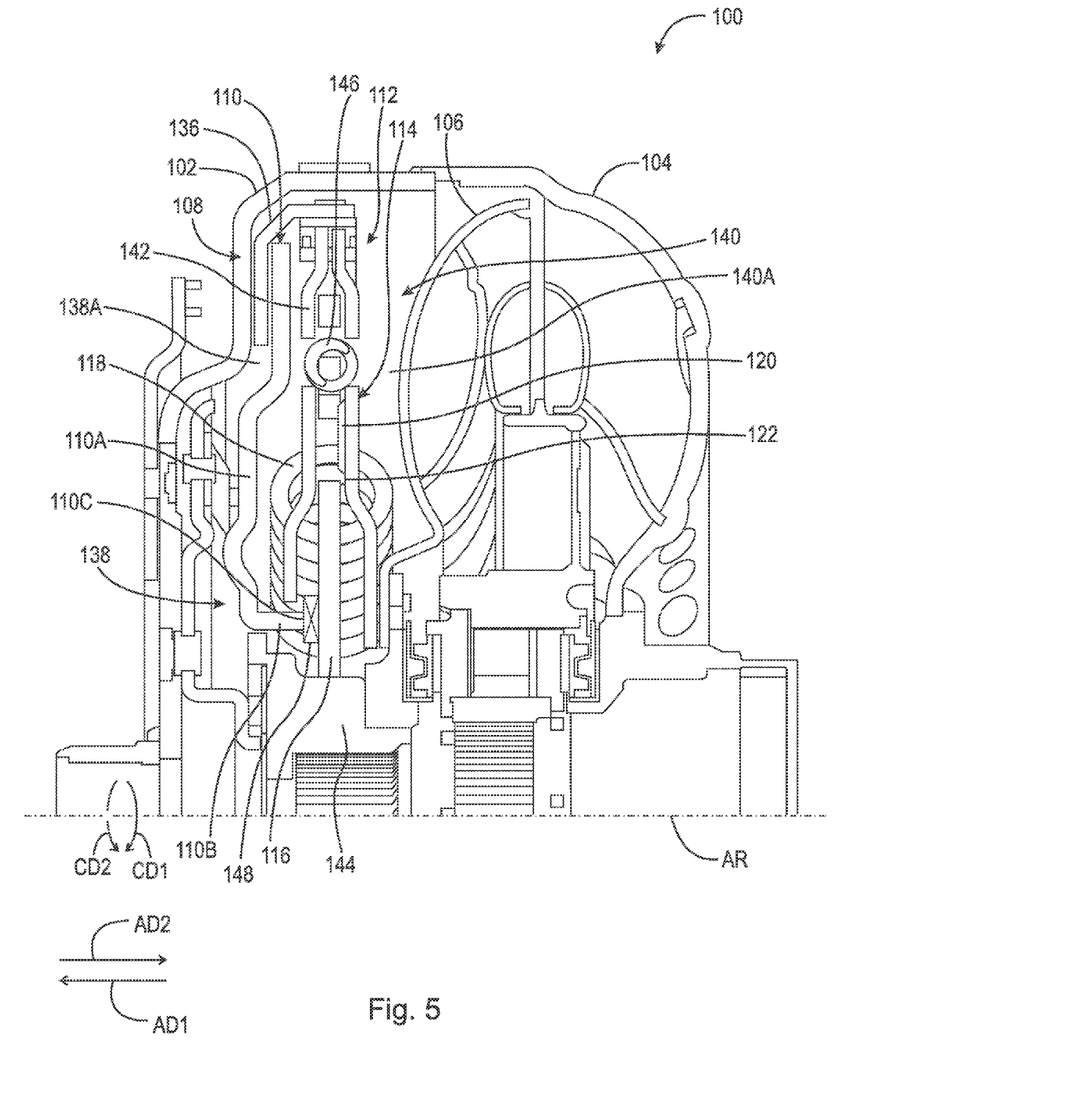
FIG. 5 is a cross-sectional view of the torque converter shown in FIG. 2 with a thrust bearing.

FIG. 5 is a cross-sectional view of torque converter 100 shown in FIG. 2 with thrust bearing 148.

Figure 6:
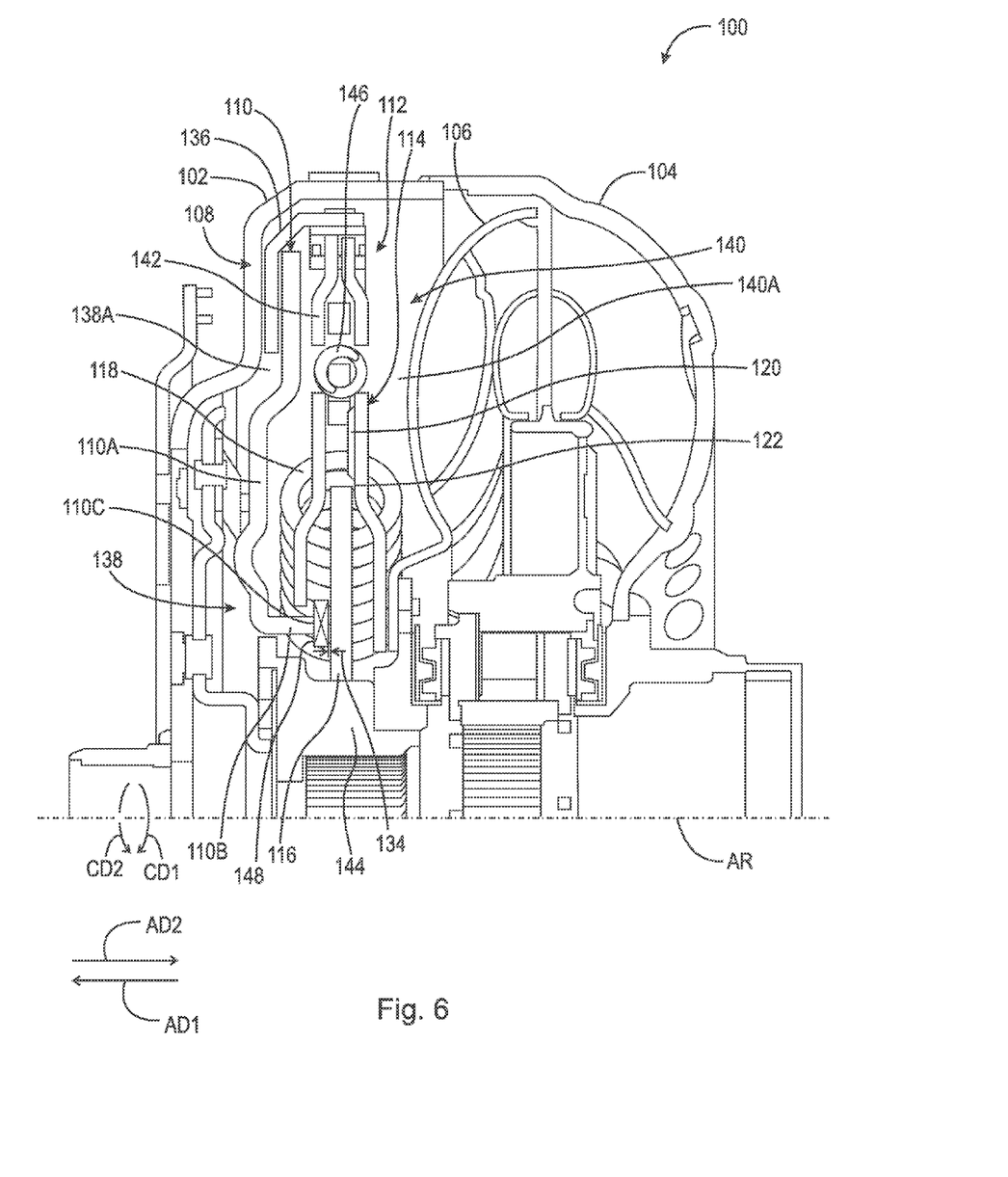
FIG. 6 is a cross-sectional view of the torque converter shown in FIG. 5 in a lockup mode; and, FIG. 7 is a partial cross-sectional view of a prior art torque converter.

FIG. 6 is a cross-sectional view of torque converter 100 shown in FIG. 5 in a lockup mode. In an example embodiment, torque converter 100 includes thrust bearing 148 axially located between piston 110 and output flange 116. The discussion for FIGS. 2 through 4 is applicable to FIGS. 5 and 6 except as noted. For the coast mode, output flange 116 is arranged to displace in axial direction AD1 to bring thrust bearing 148 into engagement with piston 110 and output flange 116. Thus, bearing 148 reduces the drag torque and wear associated with the engagement of flange 116 with piston 110. In an example embodiment, axial space 134 is present between bearing 148 and one of piston 110 or flange 116. In the example of FIG. 6, space 134 is present between bearing 148 and flange 116.

The following provides further detail regarding torque converter 100 and operation in coast mode. Advantageously, the configuration of plate 114, output flange 116 and piston 110 enables clutch 108 to remain closed in coast mode without the use of the sealing element required in the prior art torque converter discussed above. In particular, in the coast mode, the windup of cover plate 114 causes plate 114 to displace in direction CD2 with respect to flange 116. This relative displacement causes ramp(s) 120 to slide along flange 116. Since extent 124 of ramp(s) 120 increases in direction CD2 and the axial position of plate 114 is fixed, flange 116 reacts against ramp(s) 120 by displacing in direction AD1.

The displacement of flange 116 in direction AD1 displaces piston 110 in direction AD1. The displacement of piston 110 causes clutch 108 to reach the touch point in which frictional engagement, for example of drive plate 136 with cover 102 and piston 110, occurs. Once this touch point is attained, flow of fluid through clutch 108 is blocked and the hydraulic processes in chambers 138 and 140 cause low pressure in chamber 138, further clamping clutch 108 shut. Thus, the desired operation in coast mode is attained with the addition of simple and low cost modifications (portion 110C and ramp(s) 120), while eliminating the sealing element of the prior art, which as noted above, increases the cost and complexity of the torque converting, while reducing overall durability It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
an axis of rotation;
a cover arranged to receive torque in a first circumferential direction for a drive mode;
an impeller non-rotatably connected to the cover;
a turbine in fluid communication with the impeller;
a torque converter clutch including a piston; and,
a vibration damper including:
    a first cover plate connected to the torque converter clutch;
    an output flange; and,
    at least one spring engaged with the first cover plate and the output flange, wherein for a coast mode:
        the first cover plate is arranged to rotate in a second circumferential direction opposite the first circumferential direction;
        the first cover plate is arranged to displace the output flange in a first axial direction; and,
        the output flange is arranged to displace the piston in the first axial direction.

2. The torque converter of claim 1, wherein:
the first cover plate includes at least one ramp; and,
for the coast mode, the at least one ramp is arranged to displace the output flange in the first axial direction.

3. The torque converter of claim 2, wherein
the first cover plate includes a first surface facing in the first axial direction;
the at least one ramp is non-rotatably connected to the first surface; and,
an extent of the at least one ramp in the first axial direction increases along the first circumferential direction.

4. The torque converter of claim 3, wherein:
the output flange includes a second surface facing in a second axial direction, opposite the first axial direction; and,
the at least one ramp is directly engaged with the second surface; or,
the at least one ramp is in contact with the second surface.

5. The torque converter of claim 1, wherein:
the piston includes:
    a first portion; and,
    a second portion:
        extending from the first portion in a second axial direction, opposite the first axial direction; and,
        including a distal end.

6. The torque converter of claim 5, wherein for the coast mode, the output flange is arranged to contact the distal end to displace the piston in the first axial direction.

7. The torque converter of claim 5, wherein for the drive mode, an axial space is present between the output flange and the distal end.

8. The torque converter of claim 5, further comprising:
a thrust bearing axially located between the piston and the output flange, wherein for the coast mode, the output flange is arranged to displace in the first axial direction to bring the thrust bearing into engagement with the piston and the output flange.

9. The torque converter of claim 1, wherein:
the torque converter clutch includes a drive plate non-rotatably connected to the first cover plate; and,
for the coast mode, the output flange is arranged to displace in the first axial direction to frictionally engage the cover, the drive plate, and the piston to transmit torque between the cover and the first cover plate.

10. The torque converter of claim 9, further comprising:
a first chamber including a portion axially disposed between the cover and the piston; and,
a second chamber including a portion axially disposed between the piston and the turbine, wherein the first chamber is free of a sealing element between the cover and the piston.

11. The torque converter of claim 10, wherein the vibration damper is located in the second chamber.

12. The torque converter of claim 1, wherein the first cover plate is non-rotatably connected to the turbine.

13. The torque converter of claim 1, wherein:
the vibration damper includes a second cover plate non-rotatably connected to the first cover plate and engaged with the at least one spring; and,
the flange is axially disposed between the first and second cover plates.

14. The torque converter of claim 1, wherein:
for the drive mode, the cover is rotating faster than the turbine; and,
for the coast mode, the turbine is spinning faster than the cover.

15. A torque converter, comprising:
an axis of rotation;
a cover arranged to receive torque in a first circumferential direction for a drive mode;
an impeller non-rotatably connected to the cover;
a turbine in fluid communication with the impeller;
a torque converter clutch including a piston; and,
a vibration damper including:
a cover plate connected to the torque converter clutch and including at least one ramp;
an output flange; and,
at least one spring engaged with the cover plate and the output flange, wherein for a coast mode:
the cover plate is arranged to rotate in a second circumferential direction opposite the first circumferential direction;
the at least one ramp is arranged to displace the output flange in a first axial direction; and,
the output flange is arranged to displace the piston in the first axial direction.

16. The torque converter of claim 15, wherein an extent of the at least one ramp in the first axial direction increases along the first circumferential direction.

17. The torque converter of claim 15, wherein:
the cover plate includes a first surface facing in the first axial direction;
the at least one ramp is non-rotatably connected to the first surface;
the output flange includes a second surface facing in a second axial direction opposite the first axial direction; and,
the at least one ramp is in contact with the second surface.

18. The torque converter of claim 15, wherein:
the piston includes:
a first portion; and,
a second portion:
extending from the first portion in a second axial direction, opposite the first axial direction; and,
including a distal end; and,
for the coast mode, the output flange is arranged to engage the distal end to displace the piston in the first axial direction.

19. The torque converter of claim 15, further comprising:
a first chamber including a portion axially disposed between the cover and the piston; and,
a second chamber including a portion axially disposed between the piston and the turbine, wherein the first chamber is free of a sealing element between the cover and the piston.

20. A torque converter, comprising:
an axis of rotation;
a cover arranged to receive torque in a first circumferential direction for a drive mode;
an impeller non-rotatably connected to the cover;
a turbine in fluid communication with the impeller;
a vibration damper including:
a cover plate including:
a first surface facing in a first axial direction; and,
at least one ramp non-rotatably connected to the first surface;
an output flange including a second surface facing in a second axial direction opposite the first axial direction; and,
at least one spring engaged with the cover plate and the output flange; and,
a torque converter clutch including:
a piston; and,
a drive plate non-rotatably connected to the cover plate, wherein for a coast mode:
the cover plate is arranged to rotate in a second circumferential direction opposite the first circumferential direction, with respect to the flange;
the at least one ramp is arranged to slide across the second surface to displace the output flange in the first axial direction; and,
the output flange is arranged to displace the piston in the first axial direction to frictionally engage the drive plate with the cover and the piston.

* * * * *